United States Patent
Hsu et al.

(10) Patent No.: US 7,266,969 B2
(45) Date of Patent: Sep. 11, 2007

(54) REFRIGERANT DIRECTLY COOLED CAPACITORS

(75) Inventors: John S. Hsu, Oak Ridge, TN (US); Larry E. Seiber, Oak Ridge, TN (US); Laura D. Marlino, Oak Ridge, TN (US); Curtis W. Ayers, Kingston, TN (US)

(73) Assignee: UT-Batelle, LLC, Oak Ridge, TN (US)

( * ) Notice: Subject to any disclaimer, the term of this patent is extended or adjusted under 35 U.S.C. 154(b) by 172 days.

(21) Appl. No.: 11/166,502

(22) Filed: Jun. 24, 2005

(65) Prior Publication Data

US 2006/0144069 A1 Jul. 6, 2006

Related U.S. Application Data

(60) Provisional application No. 60/641,701, filed on Jan. 6, 2005.

(51) Int. Cl.
 *F28D 5/00* (2006.01)

(52) U.S. Cl. .................................................... 62/310
(58) Field of Classification Search ............ 62/259.2, 62/310, 498; 361/699
 See application file for complete search history.

(56) References Cited

U.S. PATENT DOCUMENTS

| 6,986,385 | B1* | 1/2006 | Gilles et al. ............... 165/202 |
| 2004/0093887 | A1* | 5/2004 | Shyy et al. ............... 62/259.2 |
| 2004/0261439 | A1* | 12/2004 | Wayburn et al. ........... 62/259.2 |

* cited by examiner

*Primary Examiner*—Melvin Jones
(74) *Attorney, Agent, or Firm*—Kirk A. Wilson

(57) ABSTRACT

The invention is a direct contact refrigerant cooling system using a refrigerant floating loop having a refrigerant and refrigeration devices. The cooling system has at least one hermetic container disposed in the refrigerant floating loop. The hermetic container has at least one electronic component selected from the group consisting of capacitors, power electronic switches and gating signal module. The refrigerant is in direct contact with the electronic component.

6 Claims, 14 Drawing Sheets

US 7,266,969 B2

REFRIGERANT DIRECTLY COOLED CAPACITORS

CROSS-REFERENCE TO RELATED APPLICATIONS

This application claims priority to U.S. Provisional Patent Application 60/641,701 filed Jan. 6, 2005, herein incorporated by reference. This application is also related to U.S. Pat. No. 6,772,603, issued Aug. 10, 2004, U.S. patent application Ser. No. 10/716,060 filed Nov. 18, 2003, and U.S. patent application Ser. No. 10/926,205 filed Aug. 25, 2004, all herein incorporated by reference in their entirety.

STATEMENT REGARDING FEDERAL SPONSORSHIP

This invention was made with Government support under contract no. DE-AC05-00OR22725 to UT-Battelle, LLC, awarded by the United States Department of Energy. The Government has certain rights in the invention.

TECHNICAL FIELD

The present invention relates generally to cooling of power electronics components and specifically to cooling of power electronics capacitors in direct contact with refrigerant in a floating refrigeration loop thereby increasing the permissible ripple current of the capacitors.

BACKGROUND OF THE INVENTION

In order to cool electric motors and power electronic inverters, two-phase cooling with the coolant changing from the liquid phase to the vapor phase is far more effective than using single-phase, such as a liquid to liquid heat transfer. The significant latent heat associated with two phase heat transfer makes two-phase cooling so attractive. Two-phase cooling answers the needs for increasing power density and to cool higher heat fluxes in inverters and traction drive motors.

Currently there are two cooling liquids available in an internal combustion engine vehicle. One is the 105° C. ethylene glycol/water supply obtained from the radiator. The other one is the 85° C. transmission oil. Strictly speaking, there is also refrigerant at high pressure available for passenger compartment air conditioning. Most people with the experience of their expensive household air-conditioning bills would have an impression that cooling the motors and inverters with a technology that is related to an air conditioning system would be impractical and expensive. Floating loop refrigerant cooling teaches that this is not necessarily true when the floating-loop system is used to cool the motors and inverters in conjunction with the air-conditioning system of a vehicle.

The cooling of various loads in a vehicle is currently conducted in a piece-meal fashion. An independent cooling system is used for the passengers. The major drive system of a hybrid or an electric vehicle contains a power electronic inverter. The direct current (DC) link capacitor is the most expensive and also the most bulky item in an inverter. To date, innovations in the thermal management of electric capacitors utilized in power electronics have been relatively limited. They have traditionally been restricted to single-phase cooling techniques, such as fans or heat sinks cooled by water or air. Although the two-phase-cooling heat pipes are available for capacitors, their cooling effects are limited as compared with the technology introduced in this invention.

In order to reduce the size of the DC link capacitor, the current invention teaches that by choosing the capacitor material to be compatible with the refrigerant, the capacitor can be in direct contact with the refrigerant. Unique two-phase cooling technique includes various surface treatments, spray, impingement, and capacitor arrangements. The permissible ripple current can be raised several times that of capacitors without direct refrigerant cooling. The use of this technology results in a smaller and less costly inverter.

BRIEF SUMMARY OF THE INVENTION

It is known that for certain electric capacitors, such as film capacitors, the permissible ripple current that goes through the capacitor is affected by the operating temperature of the capacitor. The lower the temperature is, the higher the permissible ripple current. This invention uses direct refrigerant cooling of the capacitor to significantly raise the permissible ripple current resulting in a smaller and less costly apparatus.

The invention is a direct contact refrigerant cooling system using a refrigerant floating loop having a refrigerant and refrigeration devices. The cooling system has at least one hermetic container disposed in the refrigerant floating loop. The hermetic container has at least one electronic component selected from the group consisting of capacitors, power electronic switches and gating signal module. The refrigerant is in direct contact with the electronic component.

DETAILED DESCRIPTION OF THE INVENTION

Figure 1:
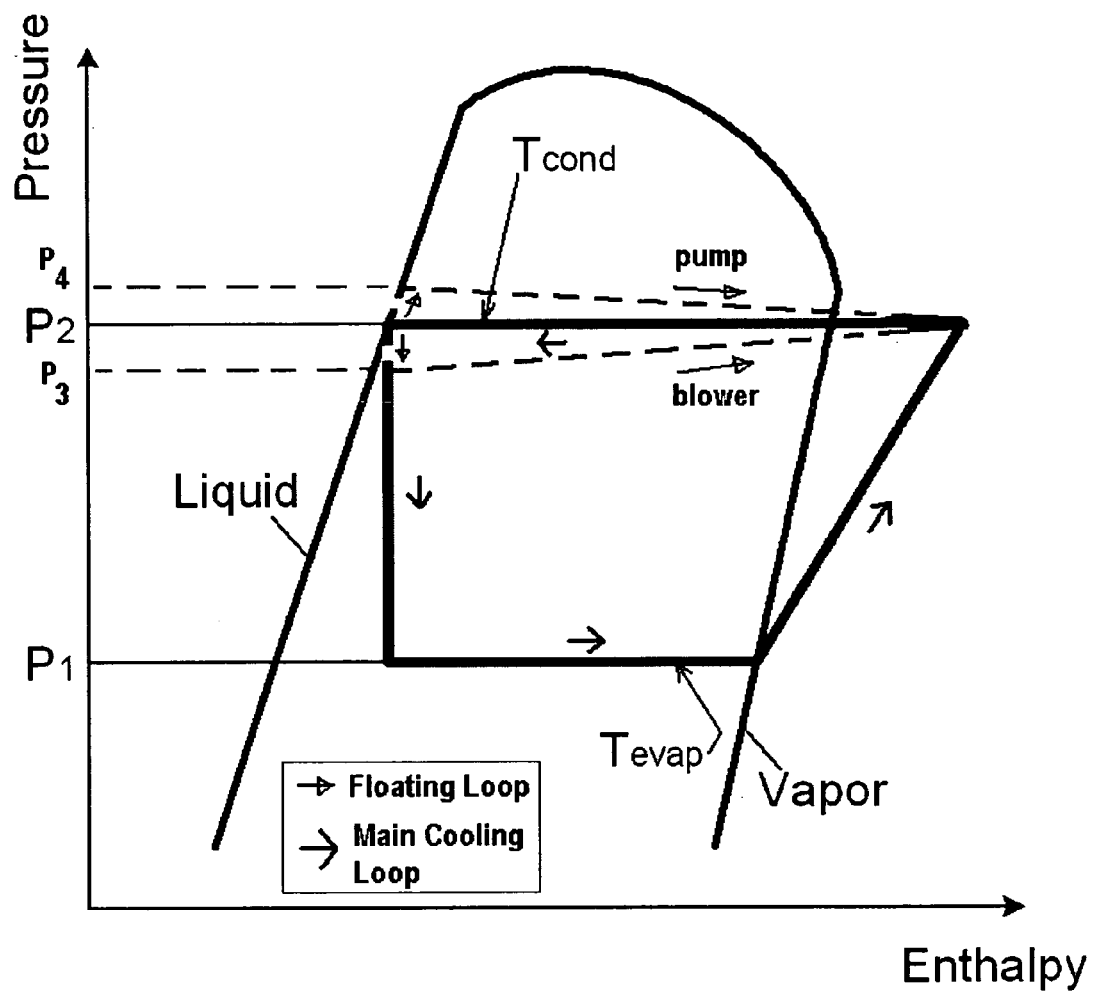
FIG. 1 is a pressure vs. enthalpy diagram of a vapor compression cycle showing the floating refrigerant loop in the invention.

In FIG. 1, the pressure versus enthalpy properties of a refrigerant for a refrigeration cycle is plotted. Starting from the upper left corner of the cycle, the refrigerant liquid at a high pressure $P_2$ and high temperature, $T_{cond}$, flows through an orifice or a capillary reducing its pressure to $P_1$. The vertical drop at the left-hand side of the cycle indicates a constant enthalpy process. The lower left corner of the cycle shows the beginning of the expansion process taking place in the evaporator that gradually changes the liquid to vapor. The evaporator has a lower pressure $P_1$ and a lower temperature $T_{evap}$. When the refrigerant in the evaporator absorbs the heat the enthalpy of the refrigerant increases, as represented by the bottom horizontal line. At the lower right corner of the cycle the refrigerant enters a compressor. The refrigerant is compressed into a high-temperature vapor that follows a constant entropy line. At the upper right corner of the cycle the refrigerant starts to dissipate its heat in a condenser and gradually changes its phase to a liquid. This is indicated by the upper horizontal line of the cycle, with the process moving to the left.

The high energy requirement of the compressor of a conventional air conditioning system is mainly caused by the pressure difference, $P_1$-$P_2$ that the compressor has to overcome in order to produce a low temperature at the evaporator side. For cooling motors and inverters the liquid at the condenser side temperature is cold enough. Therefore, it is not necessary to have a significant pressure difference between the evaporator and condenser thus the instant invention only requires a very small pump or fan to move the fluid through the floating two-phase cooling sub-system. Whereas, a thermosyphon depends on liquid weight for the circulation and this requires a level installation. The cooling density of the thermosyphon is not high, i.e. a low heat flux per unit volume, and also would require separate cooling and condensing components be added to the system. The technology given in this invention overcomes the problems of the thermosyphon but retains its advantage of low power consumption. FIG. 1 shows the floating loop pressure-enthalpy relationship for the subject invention configurations with a liquid pump or a vapor blower. The pressure $P_4$ is very slightly above the $P_2/T_{cond}$ line, and this indicates use of a small liquid pump in the floating loop to move the fluid. $P_3$ is very slightly below the $P_2/T_{cond}$ line, indicating the system uses a vapor blower to move the fluid through the loop. In either case, the differential pressure ($P_4$-$P_2$, or $P_2$-$P_3$) is very small, which indicates a low energy requirement to operate the additional "floating" cooling loop.

Figure 2:
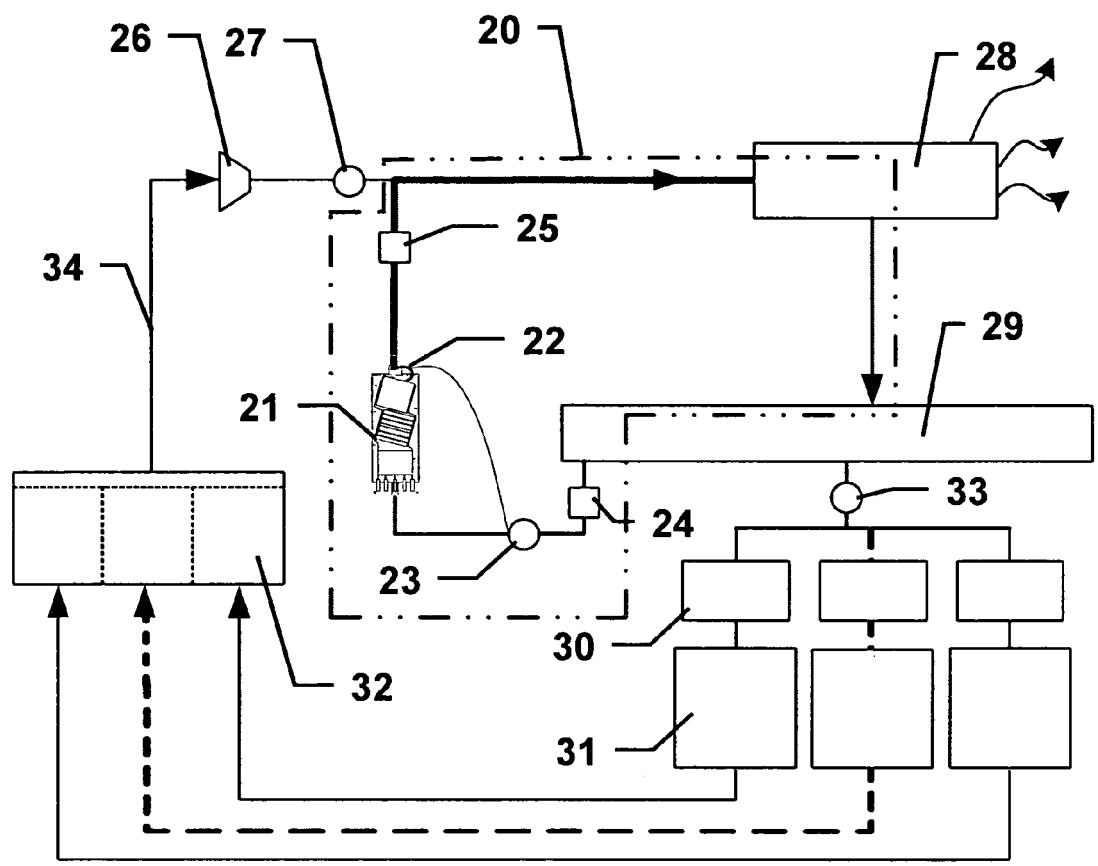
FIG. 2 is a schematic diagram showing elements of an embodiment of the invention.

FIG. 2 shows an embodiment of the system of this invention. The refrigerant vapor compression floating loop 20 is used to cool the capacitors 21 located in an integrated inverter by tapping into hot liquid refrigerant at the refrigerant reservoir 29 and using an optional pump 24 to pump the hot liquid refrigerant through a heat exchanger as shown in FIGS. 3, 4, 7, 8 and 9. An optional level sensor 22 and liquid level cutoff valve 23 controls the liquid refrigerant level in the heat exchanger. An optional floating loop blower 25 pumps the refrigerant vapor into the vapor compression cycle. The heat from the capacitors 21 evaporates the hot liquid refrigerant thereby delivering hot vapor refrigerant into the vehicle air-conditioning system. The air-conditioning compressor 26 pumps the hot vapor through an optional unidirectional valve 27 and into the condenser 28 where the heat is dumped to atmosphere resulting in hot liquid refrigerant. The hot liquid refrigerant collects in the refrigerant reservoir 29 and a portion of the hot refrigerant liquid not used in the floating loop passes through a valve 33 and is expanded in an orifice 30 or other suitable expansion device to generate cool liquid refrigerant for the evaporator 31. Heat is transferred to the refrigerant in the evaporator 31 thereby cooling the indoor or vehicle cabin air and generating hot vapor refrigerant that passes through pressure controls 32 into the suction side of the air-conditioning compressor 26. All devices are interconnected using refrigerant piping 34.

Figure 3:
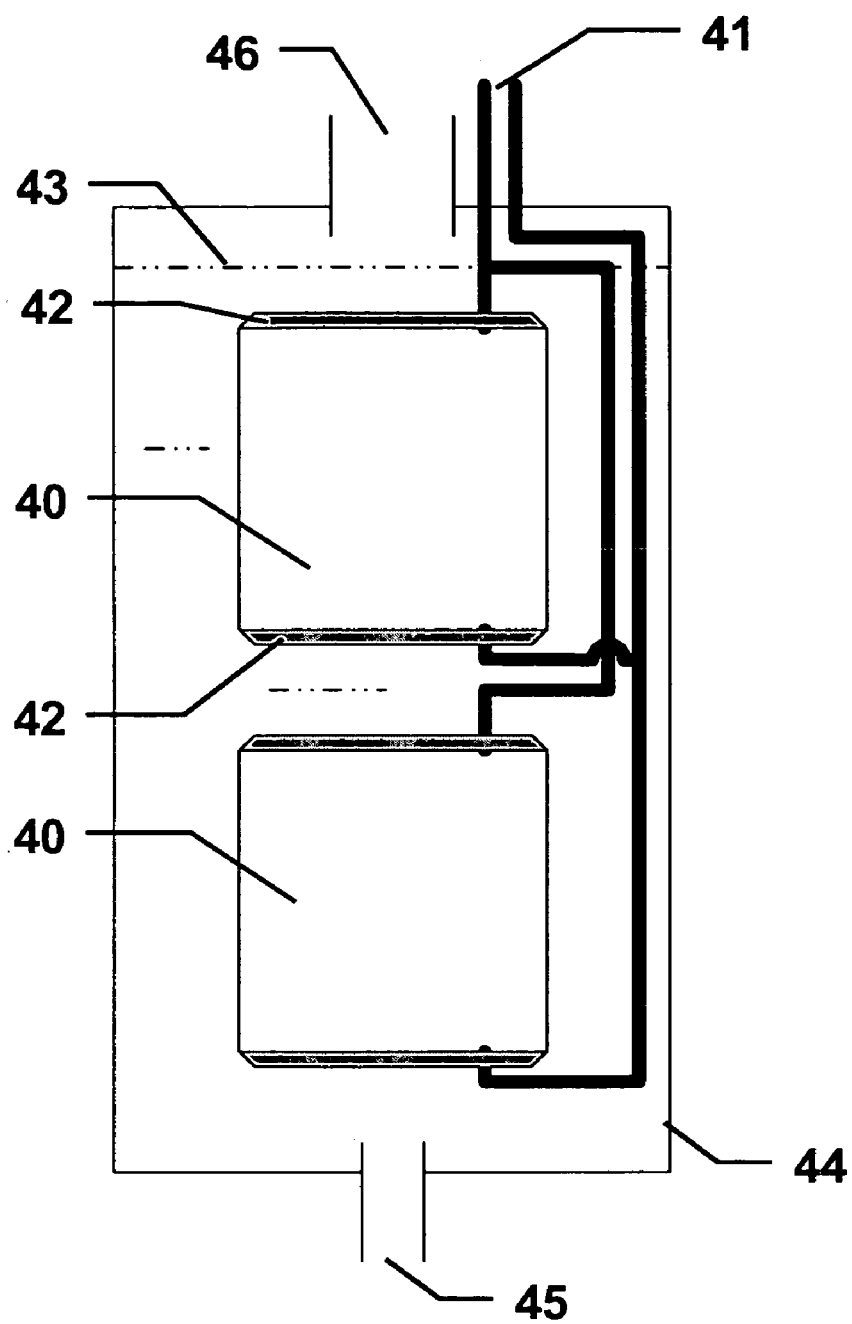
FIG. 3 shows a simple example of submerged cooling of capacitors.

FIG. 3 shows a simple example of submerged cooling of capacitors. The capacitors 40 are situated inside a hermetic container 44 filled with liquid refrigerant 43. Liquid refrigerant entry 45, on the hermetic container 44, passes refrigerant to cool the capacitors 40 thereby evaporating the liquid refrigerant into a vapor refrigerant exit 46. Surface treatment 42 on the capacitors 40 optimizes heat transfer between the refrigerant and capacitors. Capacitor leads 41 provide electrical service.

Figure 4:
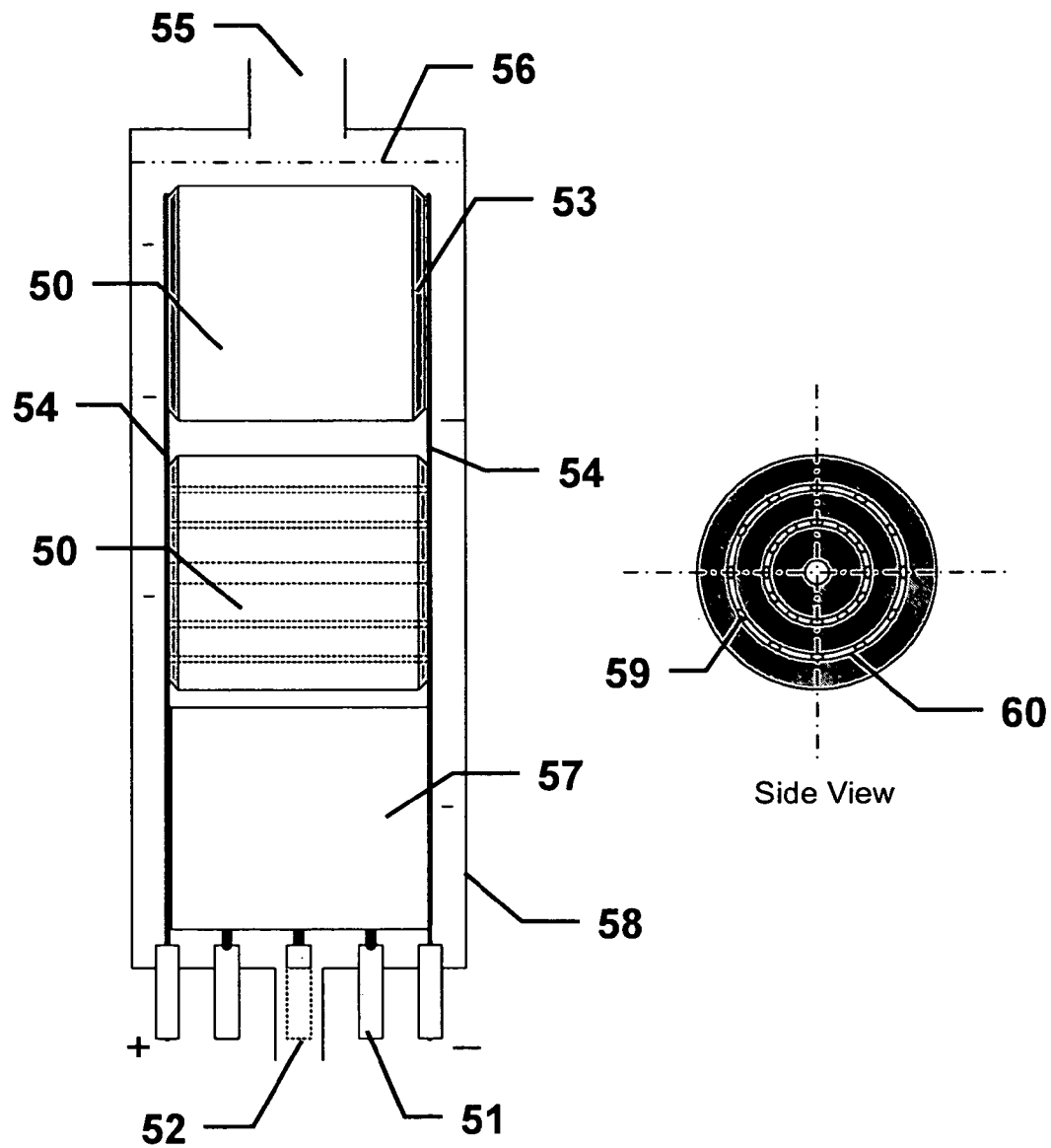
FIG. 4 shows that the capacitor may be wound with cooling channels for the refrigerant liquid to go in and the bubbles to come out.

FIG. 4 shows that the capacitor 50 may be wound with cooling channels 60 with spacers 59 for the refrigerant liquid 56 to go in and the bubbles to come out. The cooling channels 60 can be routed in any direction and serve as a small conduit for passing refrigerant liquid and vapor that is in direct contact with most of the capacitor surface area. The DC bus conductors 54 are connected at each side of the capacitors 50. The inverter components include the capacitors 50, power electronic switches (IGBT, MOSFET, etc.) and gating signal module 57, and the sensors are housed inside a hermetic container 58 with sealed terminals 51 for electrical connections.

Figure 5:
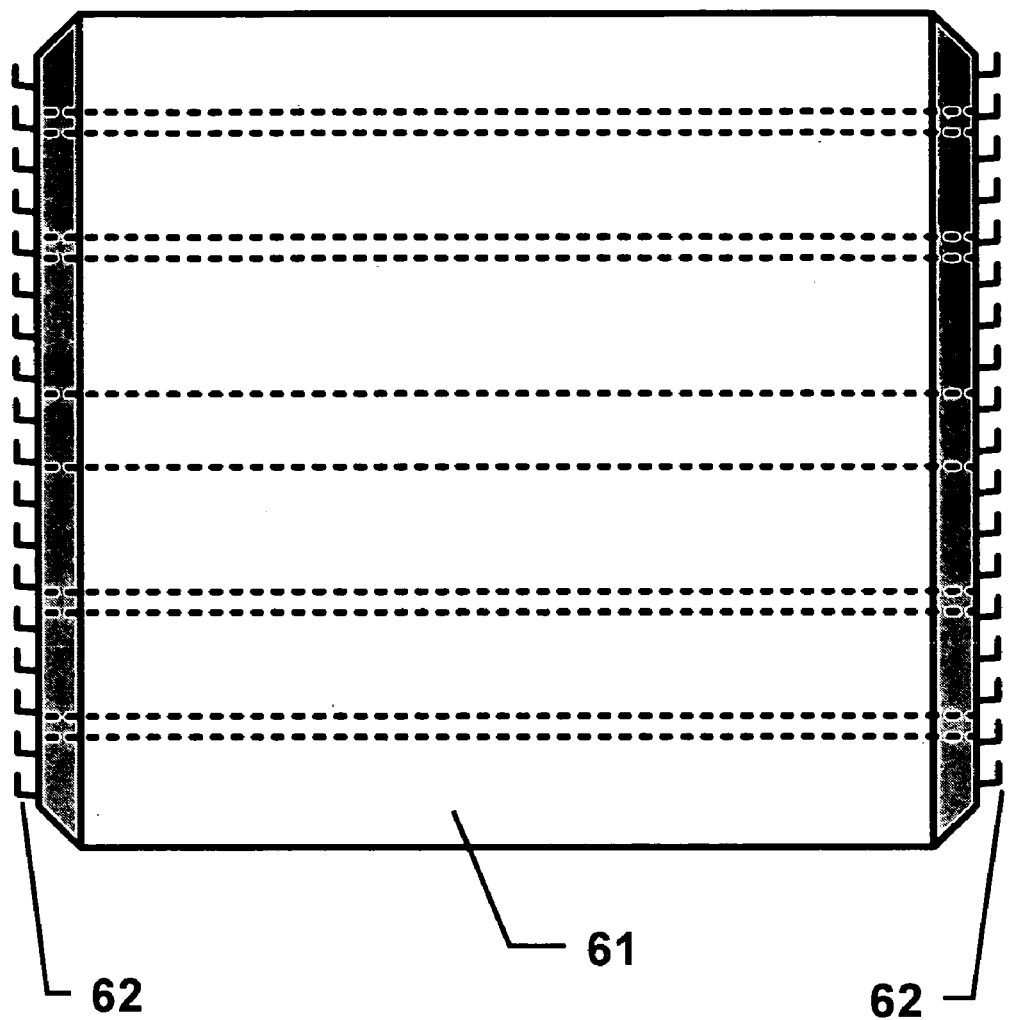
FIG. 5 shows a sample arrange of the surface treatments.

It is known that for pool boiling, nucleate boiling promotes heat transfer and the film boiling provides additional heat transfer resistance. Many known approaches for surface treatments, such as low fins, roughened surfaces, and reentrant grooves in many shapes, can be used for bubble ejection to avoid film boiling. FIG. 5 shows a sample arrange of the surface treatments 62 on a capacitor 61.

Figure 6:
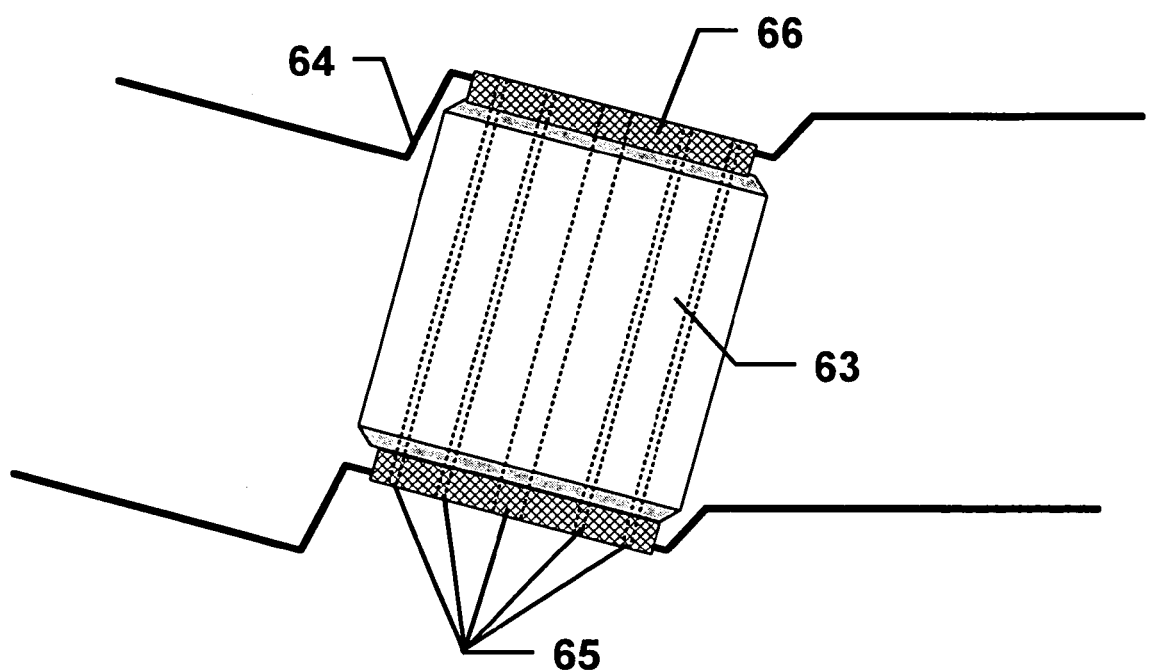
FIG. 6 shows an embodiment using electrically conducting foams such as copper or other metal and graphite foams.

FIG. 6 shows electrically conducting foams 66 such as metal foams (copper foams, aluminum foams, etc.) and graphite foams (pitch derived carbon foams, etc.) can be used for electrical conduction from the DC bus 64 and for promoting heat transfer from the capacitor 63 in any cooling method as well as for bubble ejection when submerged cooling is used. Cooling channels 65 may be used in the foam 66. The foam 66 may have a higher thermally conducting axis that should be accounted for to guide the heat transfer properly. The foam 66 may also be designed with gradually changing pore densities along the thickness of the foam for improved cooling.

Figure 7:
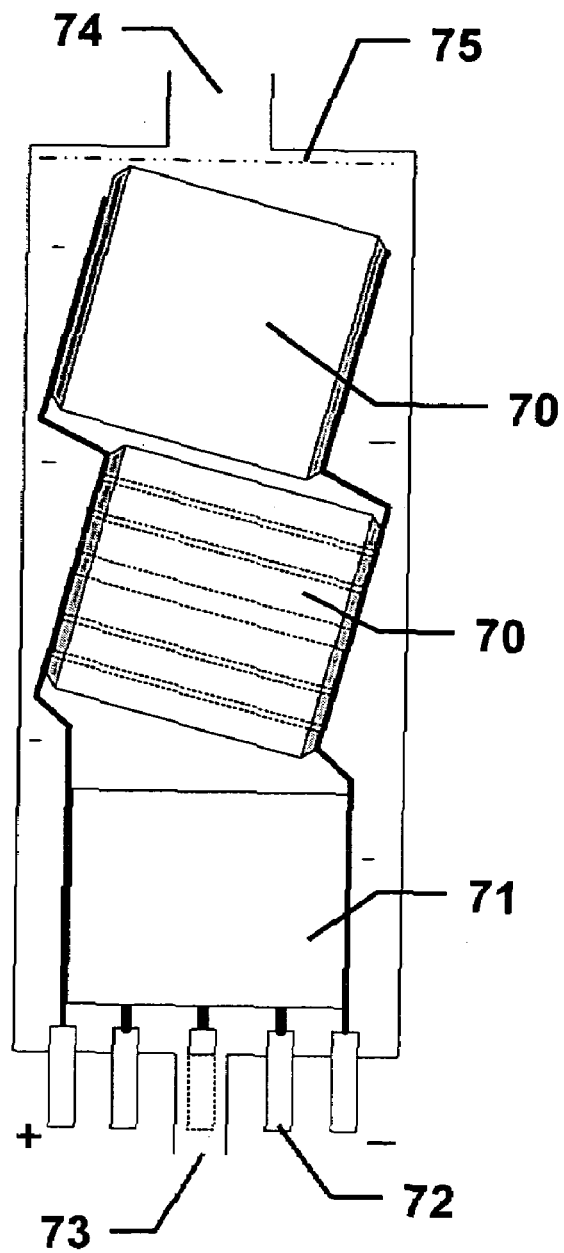
FIG. 7 shows that in order to allow the bubbles to emerge from the cooling channels a tilted capacitor mounting may be beneficial.

FIG. 7 shows that in order to allow the bubbles to emerge from the cooling channels a tilted capacitor 70 mounting may be beneficial. The tilted capacitors 70 may be wound with cooling channels. The DC bus conductors are connected at each side of the tilted capacitors 70. The inverter components include the capacitors 70, power electronic switches (IGBT, MOSFET, etc.) and gating signal module 71, and the sensors are housed inside a hermetic container with sealed terminals 72 for electrical connections.

Figure 8:
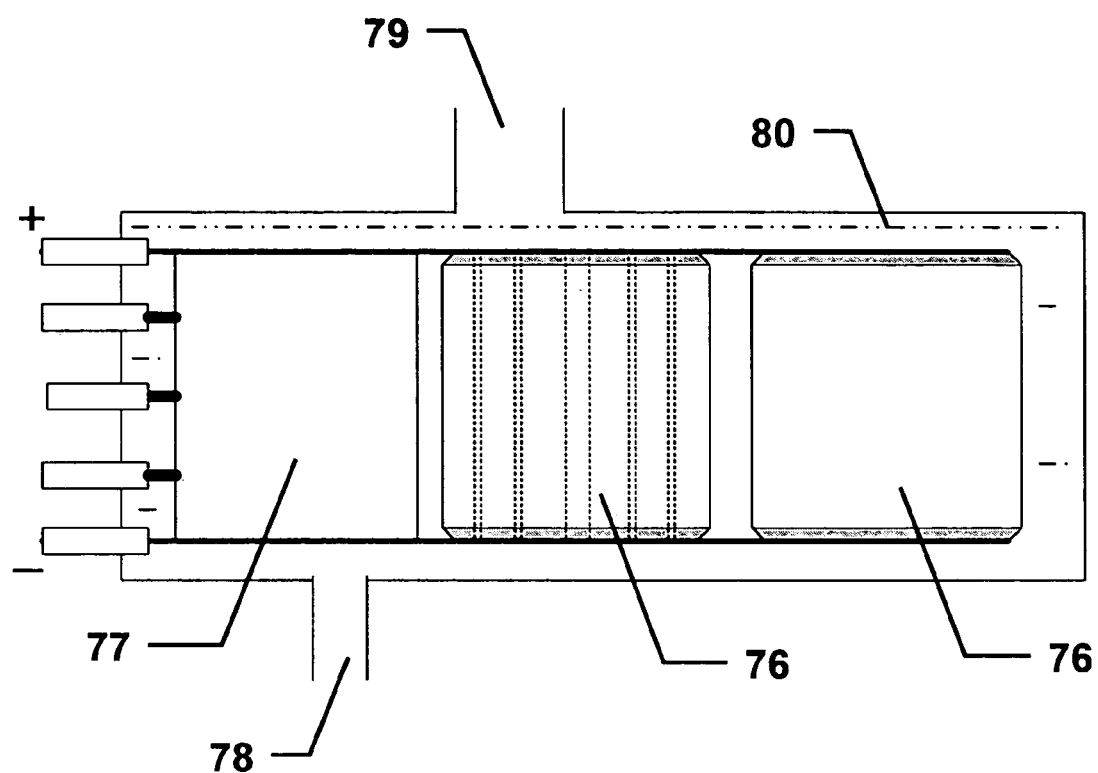
FIG. 8 shows an embodiment that has capacitors mounted horizontally.

FIG. 8 shows the inverter having capacitors 76 mounted horizontally and submerged in liquid refrigerant 80.

Figure 9:
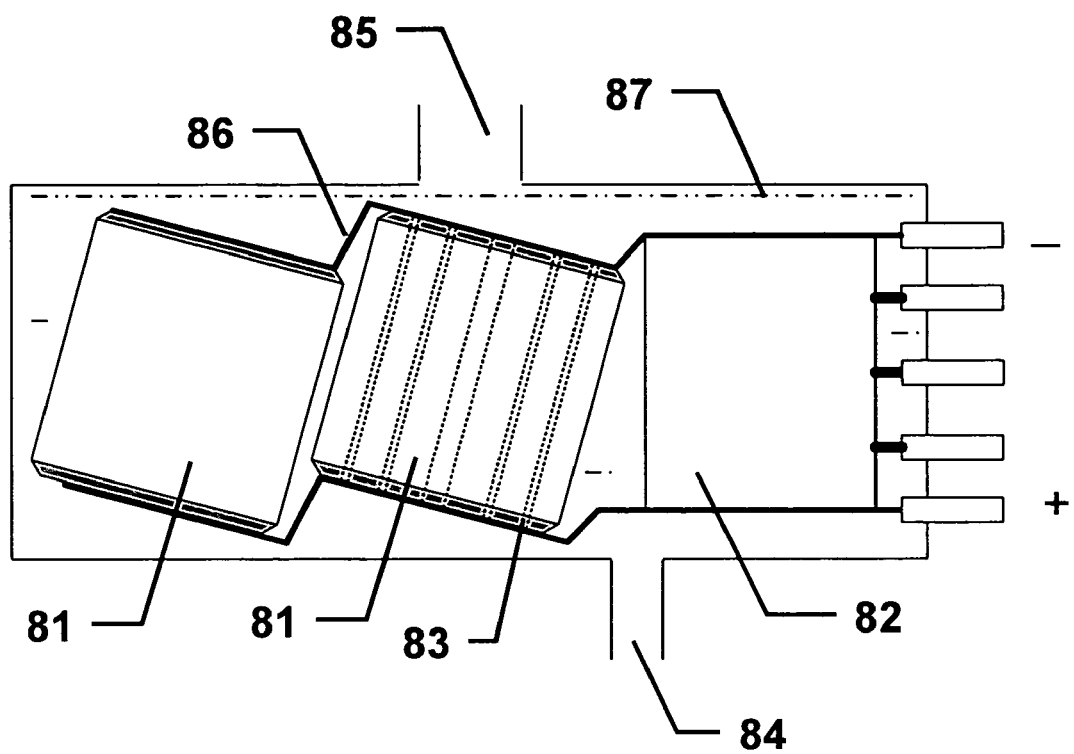
FIG. 9 shows a horizontally mounted inverter embodiment.

FIG. 9 shows the horizontally mounted inverter with the tilted capacitors 81 and cooling channels 83 inside a hermetic container.

Figure 10:
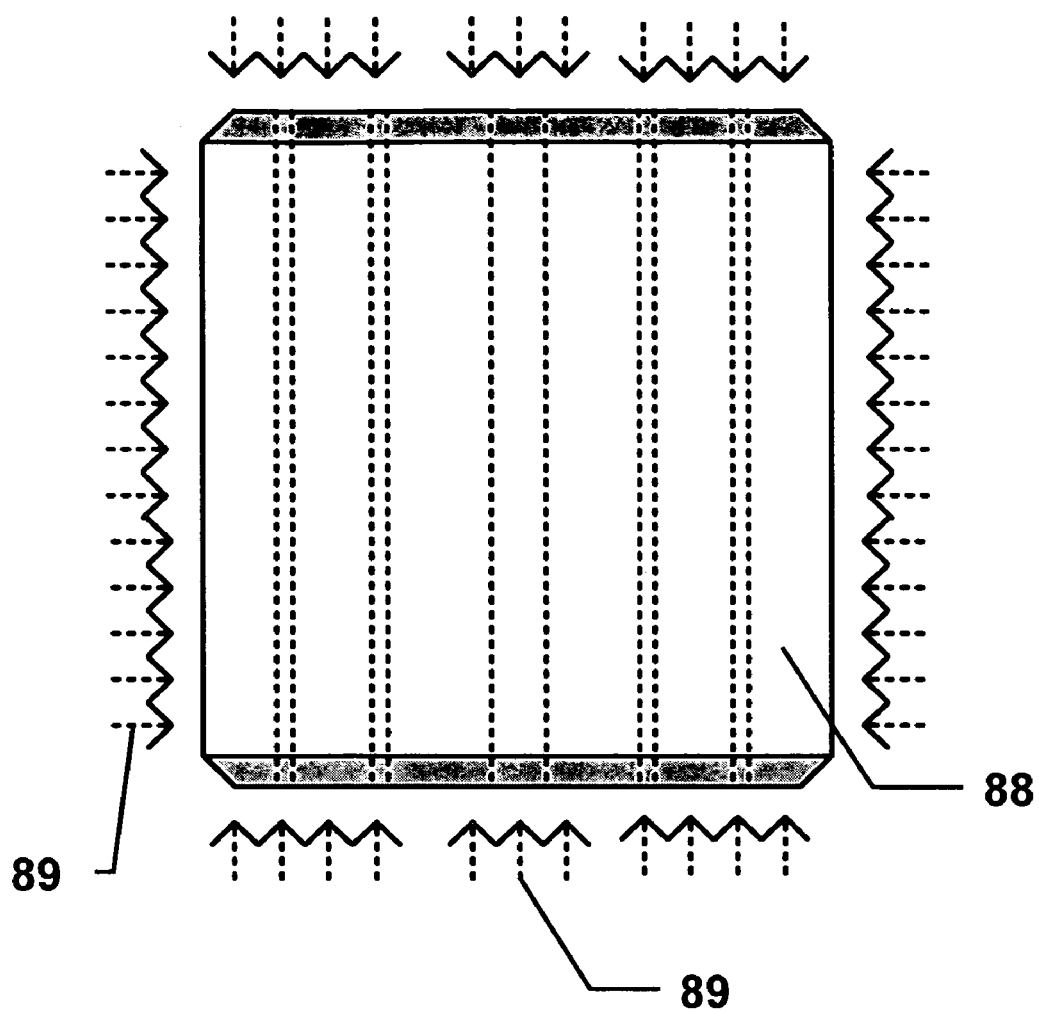
FIG. 10 shows a spray cooling scheme that sprays the refrigerant droplets onto the surfaces.

In order to enhance refrigerant vaporization, FIG. 10 shows a spray cooling scheme that sprays the refrigerant droplets 89 onto the surfaces of the capacitor 88, the end connections, and the channels of the capacitor. When spray cooling is used the capacitors 88 are not submerged in the refrigerant liquid.

Figure 11:
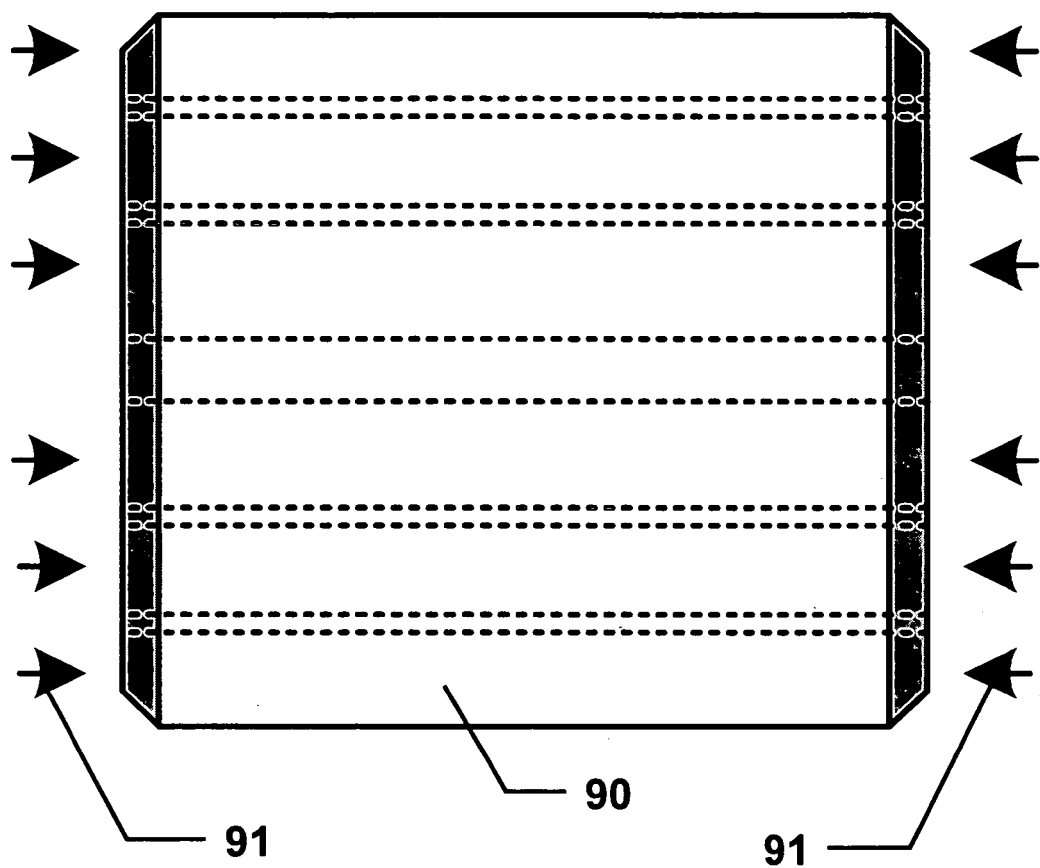
FIG. 11 shows an example of using jet impingement for cooling capacitors.

FIG. 11 shows an example of using jet impingement 91 for cooling capacitors 90. The jets distribute the liquid refrigerant to the critical surfaces. Additional pumping energy would be necessary for spray and jet impingement cooling.

Figure 12:
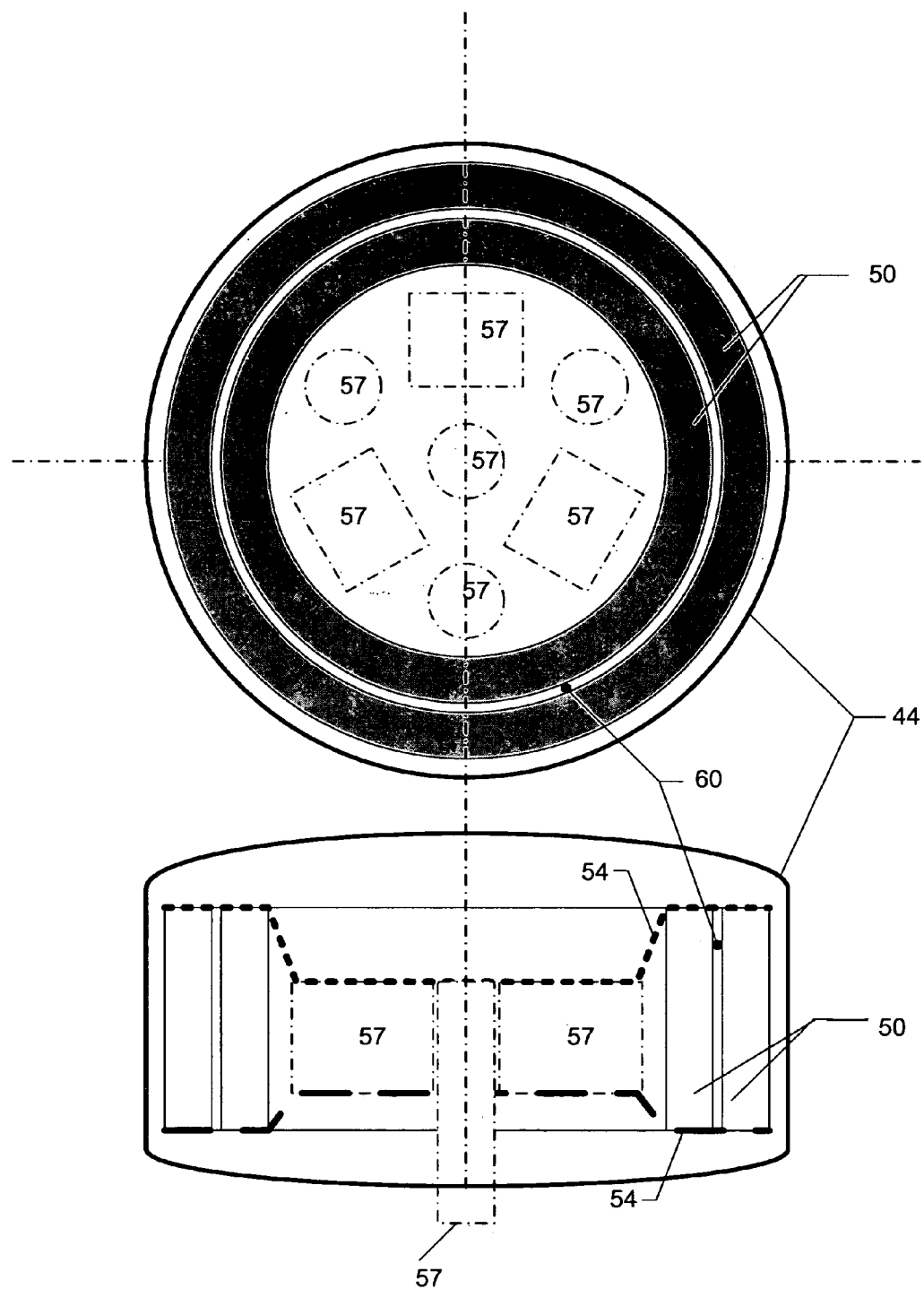
FIG. 12 shows an arrangement of electronic components inside a hermetic container.

FIG. 12 shows an arrangement of electronic components inside a hermetic container 44 where multiple capacitor 50 cylinders have cooling channels 60 for the refrigerant liquid to go in and the bubbles to come out. The DC bus conductors 54 are connected at each side of the capacitors 50 and gating signal module 57. The inverter components include the capacitors 50, power electronic switches (IGBT, MOSFET, etc.) and gating signal module 57 having sealed terminals for electrical connections.

Figure 13:
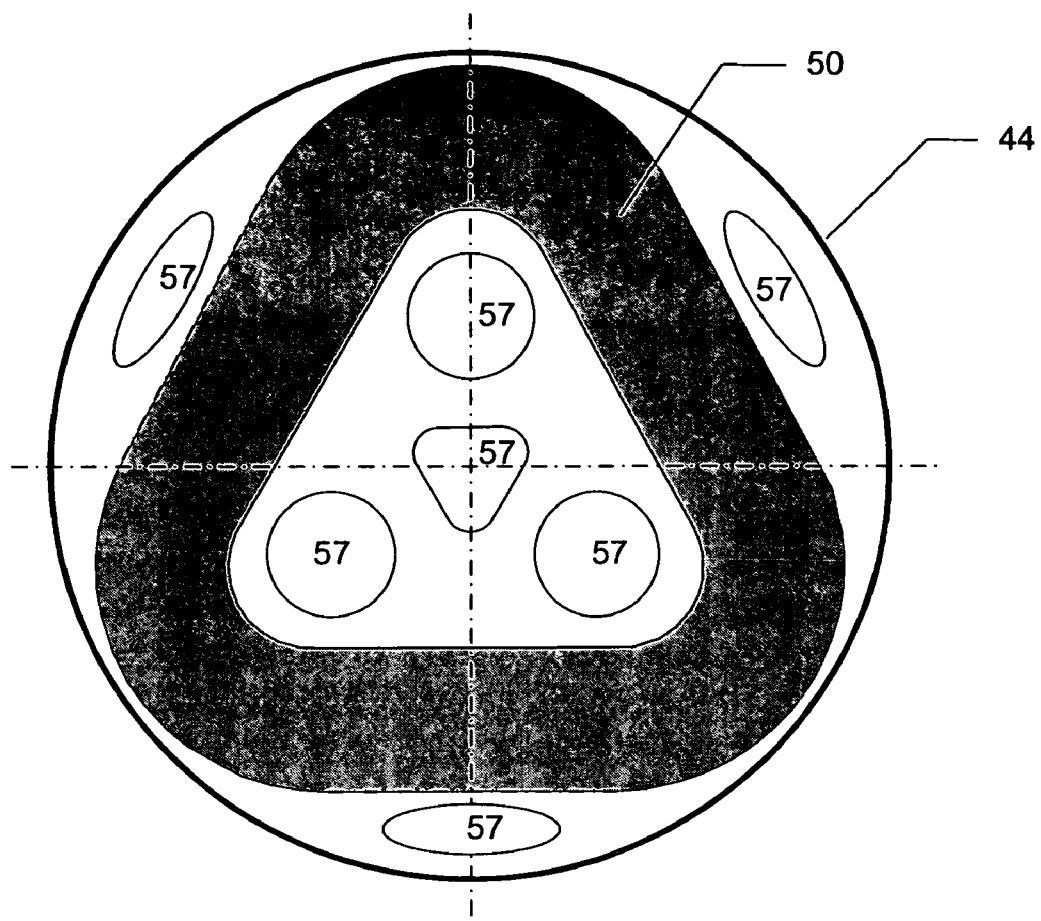
FIG. 13 shows another arrangement of electronic components inside a hermetic container.
Figure 14:
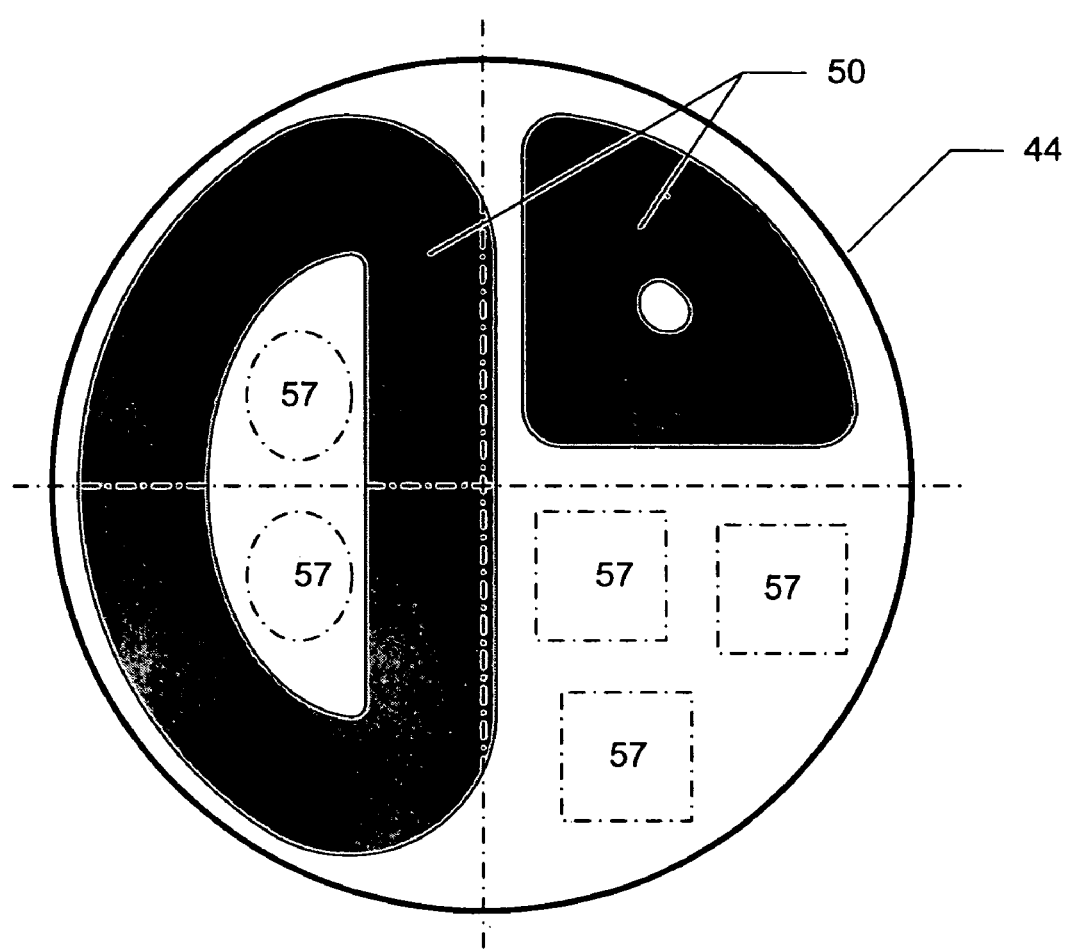
FIG. 14 shows yet another arrangement of electronic components inside a hermetic container.

FIG. 13 shows an arrangement of electronic components inside a hermetic container 44 including a capacitor 50 and gating signal modules 57 having sealed terminals for electrical connections.

FIG. 13 shows an arrangement of electronic components inside a hermetic container 44 including multiple capacitors 50 and gating signal modules 57 having sealed terminals for electrical connections.

A few of the advantageous features of the invention are described in the following paragraphs.

For hybrid and electric vehicles, the drive system normally has one or more inverters and converters that use capacitors for harmonic currents. Capacitors are bulky and expensive. This invention is a method to reduce the capacitor size and cost through a direct refrigerant cooling technology.

The capacitor is cooled in a floating refrigeration loop that is floating within the conventional air-conditioning refrigeration loop. Components can be shared as much as possible in the system. The motors and inverter/converters can be integrated and cooled in the floating loop. The DC-link capacitors of the inverter/converters can also be cooled by the refrigerant. It should be noted that the technology presented in this disclosure is not limited to vehicle applications and not limited to the R134a refrigerant commonly used in the vehicles.

Not all the DC-link capacitors can be cooled directly by the refrigerant. For example, the electrolytic capacitors cannot be submerged in the refrigerant without containers. The electrolyte and refrigerant would contaminate each other. However, many other types of capacitors, such as film capacitors that contain aluminum foil and polymer films, are compatible with a refrigerant and can be cooled directly by the refrigerant.

For a film capacitor, the positive and negative metals are deposited on a thin polymer film respectively. The films are rolled tightly together to a round cylindrical shape. The positive terminal is attached to the positive metal on the film at one end of the cylinder, and the negative the opposite end. The heat is relatively easier to travel to both ends due to the direct contact to the metal. However, because the metal on the film is very thin, the thermal resistance is still quite high.

Breaking a single large capacitor into several shorter capacitors provides more ends for cooling. Direct cooling of the center and outer peripheral surfaces of the capacitor can also benefit the cooling of the capacitor. Using multiple cooling channels can help promote heat transfer.

The surface treatments, such as low fins, roughened surfaces, and reentrant grooves in many shapes, can be used for bubble ejection to avoid film boiling and to enhance the boiling heat transfer.

Electrically conducting foams such as copper or other metal and graphite foams can be used for electrical conduction and for spreading the heat in any cooling method as well as for bubble ejection when submerged cooling is used. The foam may have a thermal conducting direction that should be accounted for in the thermal design. The foam may also be designed with gradually changing pore densities along the thickness of the foam for improved cooling.

A hermetic container would be required for housing the capacitor. The pressure withstanding capability of the container depends on the type of refrigerant used in the cooling system.

In order to allow the bubbles be ejected from the cooling channels a tilted capacitor mounting may be beneficial. However, the inverter capacitors can be mounted horizontally, vertically, or tilted.

In order to enhance the vaporization, spray cooling can be used, which sprays refrigerant droplets on the surfaces, the end connections, and the channels of the capacitor. When spray cooling is used the capacitors are not submerged in the refrigerant liquid.

This invention also covers the jet impingement for cooling capacitors. The jets distribute the liquid refrigerant to the critical surfaces. Additional pumping energy would be used for the spray and jet impingement cooling.

In practice, a mixture of the different technologies presented in this invention for capacitor cooling may be used.

While there has been shown and described what are at present considered the preferred embodiments of the invention, it will be obvious to those skilled in the art that various changes and modifications can be made therein without departing from the scope.

We claim:

1. A direct contact refrigerant cooling system comprising:
   a refrigerant floating loop further comprising a refrigerant and refrigeration devices;
   at least one hermetic container disposed in said refrigerant floating loop, said hermetic container further comprising at least one electronic component selected from the group consisting of capacitors, power electronic switches and gating signal module;
   wherein said refrigerant is in direct contact with said at least one electronic component, and
   wherein said capacitors further comprise at least one cooling channel having said refrigerant disposed therein.

2. The direct contact refrigerant cooling system of claim 1 wherein said capacitors further comprise at least one surface treatment selected from the group consisting of low fins, roughened surfaces and reentrant grooves.

3. The direct contact refrigerant cooling system of claim 1 wherein said capacitors further comprise at least one electrically conductive foam selected from the group consisting of metal foam and graphite foam.

4. The direct contact refrigerant cooling system of claim 3 wherein said metal foam is at least one foam selected from the group consisting of aluminum foam and copper foam.

5. The direct contact refrigerant cooling system of claim 3 wherein said graphite foam is a pitch derived carbon foam.

6. The direct contact refrigerant cooling system of claim 1 wherein said capacitors further comprise multiple capacitor cylinders separated by cooling channels.

* * * * *